United States Patent [19]
Adachi et al.

[11] 3,779,740
[45] Dec. 18, 1973

[54] PROCESS FOR MANUFACTURE OF ULTRA LOW CARBON STEEL BY MEANS OF PLASMA ARC REFINING

[75] Inventors: Toshio Adachi; Kiyohide Hayashi, both of Nagoya, Japan

[73] Assignee: Daido Seiko Kabushiki Kaisha, Aichi-ken, Japan

[22] Filed: Feb. 9, 1973

[21] Appl. No.: 331,119

Related U.S. Application Data

[63] Continuation of Ser. No. 100,768, Dec. 22, 1970, abandoned.

[30] Foreign Application Priority Data

Dec. 23, 1969 Japan.............................. 44/103649

[52] U.S. Cl. .................................................. 75/12
[51] Int. Cl. ............................................. C21c 5/52
[58] Field of Search............................ 75/12, 13, 11

[56] References Cited
UNITED STATES PATENTS

| 3,387,967 | 6/1968 | Perry et al. | 75/12 |
| 3,615,349 | 10/1971 | Bleloch | 75/12 |
| 3,547,622 | 12/1970 | Hutchinson | 75/10 |
| 3,230,074 | 1/1966 | Roy | 75/10 UX |

Primary Examiner—L. Dewayne Rutledge
Assistant Examiner—M. J. Andrews
Attorney—Farrell R. Werbow

[57] ABSTRACT

A process for manufacturing ultra low carbon steel containing less than 0.010 percent carbon characterized by refining a steel in a specially designed plasma arc and induction heated furnace, wherein the partial pressure of CO does not exceed 1.0 atmosphere pressure, and an inert gas atmosphere is maintained in the plasma-induction furnace. Small amounts of oxidizing agents may be added to oxidize carbon in the molten steel in the furnace.

2 Claims, No Drawings

PROCESS FOR MANUFACTURE OF ULTRA LOW CARBON STEEL BY MEANS OF PLASMA ARC REFINING

This is a continuation, application Ser. No. 100,768, filed Dec. 22, 1970 now abandoned.

It has been usual that ultra low carbon steels which contain less than 0.030 percent carbon, including such stainless steels as 304L and 316L are manufactured in electric arc furnaces. However, molten steel is apt to increase its carbon percentage due to molten slag which absorbs carbon from the CO atmosphere in an electric arc furnace because the furnace uses graphite electrodes. In order to avoid the above reaction, partial pressure of CO in the furnace is decreased by lifting up the electrodes after oxygen blowing during the oxidizing period. To raise the temperature of the molten steel for alloying, the oxidation temperature of ferro-silicon, metallic silicon, or aluminum is utilized. There has also been a refining method which decreases the basicity of the molten slag by adding river sand (silica) to prevent the rise of carbon content in molten steel.

There has been another special melting method which produces ultra low carbon stainless steel by decreasing carbon content in molten steel through the process described as follows:

1. melting scrap steel mixed with high carbon ferro-chromium,
2. transferring the molten steel to a refining vessel,
3. blowing $O_2$-Ar mixed gas into the molten steel to decrease the partial pressure of CO in oxidization refining,
4. adding a small amount of alloy for adjusting the chemical compositions and to recover the chromium in molten slag.

All the process mentioned above are based on the same reaction for decreasing the partial pressure of CO in furnaces for decarburization by means of blowing $O_2$ or $O_2$-Ar mixed gas into molten steel.

This invention is to provide a new method which effectively produces ultra low carbon steel by means of induction heating and/or plasma arc heating. The feature of this process is in melting steel, heating by both induction heating and plasma arc heating, within an inert-gas atmosphere such as Ar or other proper gases (which are ironized in the plasma arc) to decrease the partial pressure of CO (partly of $CO_2$) in the furnace. In other words this invention makes use of the decarburization reaction of $C + O \rightarrow CO \uparrow$ under low partial pressure of CO. In order to get this low partial pressure of CO, it is required that appropriate oxygen sources such as, iron ore, mill scale, silica sand, and other oxygen-bearing materials be added.

It is confirmed that $O + O \rightarrow CO \uparrow$ decarburization under the proper range of carbon content is promoted notably with less chromium oxidation loss, as a result, the process has especially remarkable merit in melting ultra low carbon stainless steel.

EXAMPLE 1

(the melt comprising 3 percent silicon steel)

After scrap charging, melting is carried out by means of both plasma arc and induction heating; carbon content of the molten steel was 0.013 percent. Then, the molten steel temperature was rasied maintaining an appropriate Ar gas flow rate to regulate the partial pressure of CO in the furnace below 0.5 atmospheres.

In the meantime, refining and alloying proceeded by adding ferro-silicon, metallic manganese, lime, alumina flux, and other alloying elements and refining materials with only plasma arc heating (after switching from induction heating to induction stirring). The result of this operation showed that the carbon content of the molten steel just before tapping was decreased to 0.003 percent (3 percent silicon steel sold in the market contains about 0.01 percent carbon), while the yield of silicon added was improved to maintain about 98 percent of it. Oxygen content in the molten steel was 660 × $10^{-4}$ percent just after melt-down, and 14 × $10^{-4}$ percent just before tapping showing a deoxidation ratio of about 79 percent. Sulphur content was decreased to 0.003 percent compared to 0.031 percent showing a desulphurization ratio of about 91 percent.

EXAMPLE 2

(the melt comprising 304L stainless steel)

After charging ferro-nickel, ferro-chromium, and other alloying elements, melting was carried out by plasma arc and induction heating with the blow of Ar gas; the carbon content of molten steel just after melting down was 0.030 percent. Keeping the Ar gas atmosphere constant, the temperature of molten steel was raised and oxygenic materials like iron ore were added; the partial pressure of CO in the furnace was regulated below 0.5 atmospheres pressure. In the meantime, metallic silicon, metallic manganese, lime, fluorspar, and other alloying elements and refining materials were added while heating only by the plasma arc to keep the steel melted after switching from induction heating to stirring. As a result of this process, the carbon content of molten steel just before tapping decreased to 0.002 percent. Oxygen content in molten steel was 119 × $10^{-4}$ percent just after melt-down and 43 × $10^{-4}$ just before tapping; the deoxidation ratio was about 64 percent. The sulphur content decreased from 0.029 percent to 0.004 percent; the desulphurization ratio was about 86 percent.

Up to this time, to produce chromium bearing steel in an electric arc furnace considerable amounts of ferro-chromium has been added to molten steel in the reducing period, while now it is possible to charge all of the ferro-chromium from the start along with the scrap iron and ferro-nickel because that little ferro-chromium is dispersed to slag.

EXAMPLE 3

(the melt comprising free machining magnetic pure iron after being transferred from a pre-refining electric arc furnace)

Molten steel after preliminary refining, mainly oxidizing refining, in an ordinary electric arc furnace having a carbon content of 0.06 percent was transferred to the plasma arc furnace used in this invention. Then the molten steel was stirred by induction while blowing with a mixed gas of $N_2$ and a small amount of $O_2$. In this case, the partial pressure of CO in the plasma arc furnace was below 1.0 atmospheres. Keeping this partial pressure of CO, the temperature of molten steel was raised by plasma arc heating and necessary refining and alloying accompanied it.

As a result of this process, the carbon content of molten steel just before tapping was possibly decreased down to 0.001 percent. Also, oxygen content was 360 × $10^{-4}$ just after melt-down and 80 × $10^{-4}$ just before tapping; the deoxidation ratio was 78 percent. The sulphur content was decreased from 0.26 percent to 0.005 percent and the desulphurization ratio was 81 percent.

What we claim is as follows:

1. A process for producing ultra low carbon steel containing less than 0.010 carbon by melting, comprising:
   a. providing molten steel having a carbon content of less than 0.10 percent in a plasma arc heated and induction heated furnace;
   b. decarburizing the molten steel in said furnace by heating the molten steel by both plasma arc heating and induction heating said steel in the presence of an added solid oxidizing agent while said steel is under a substantially inert gas atmosphere in which the partial pressure of CO is less than 1.0 atmosphere; and then
   c. regulating the chemical composition of the molten steel by adding alloying elements and refining materials to the molten steel in the furnace after switching from induction heating to induction stirring thereby producing ultra low carbon steel containing less than 0.010 percent carbon.

2. A process according to claim 1, wherein said oxidizing agent is selected from the group consisting of: iron ore, mill scale, and silica sand.

* * * * *